Dec. 17, 1940.  R. E. KELLER  2,225,174
AUTOMATIC TRANSMISSION
Filed March 14, 1934  5 Sheets-Sheet 4
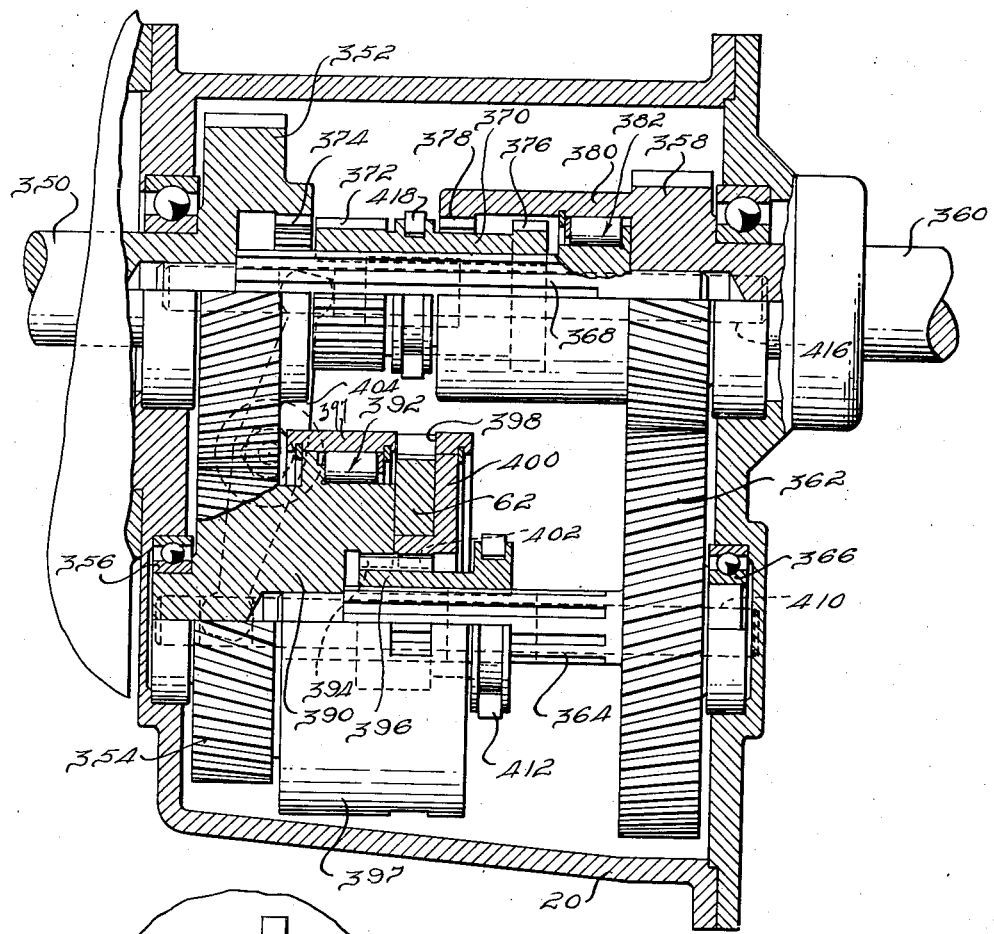
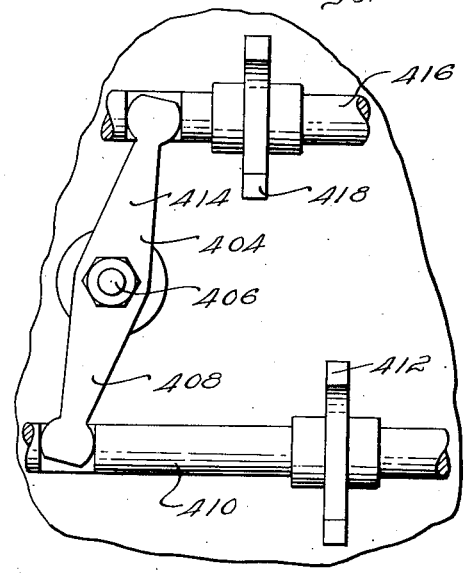
FIG. 8.
FIG. 9.
INVENTOR.
Rex E. Keller.
BY
ATTORNEY.

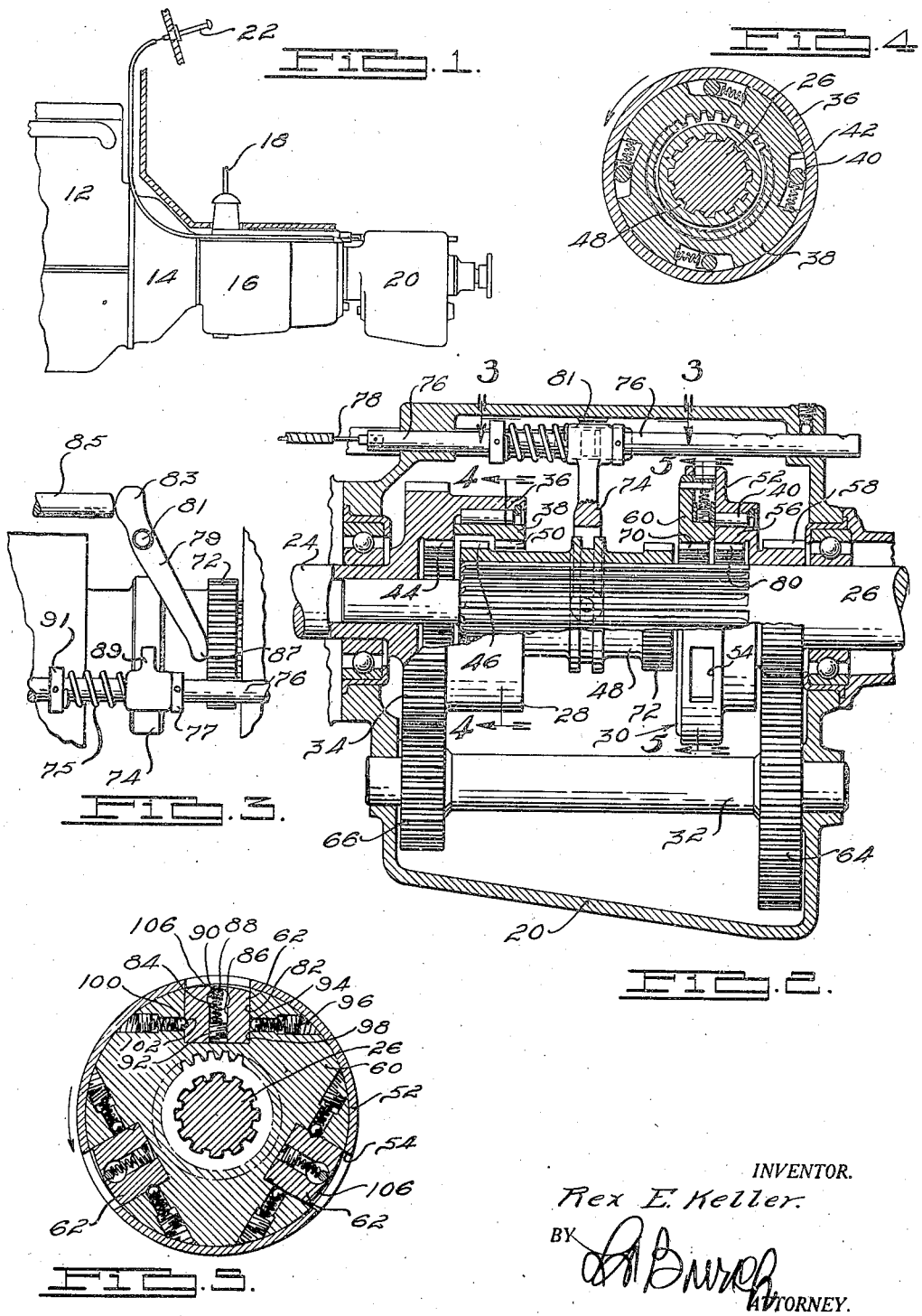

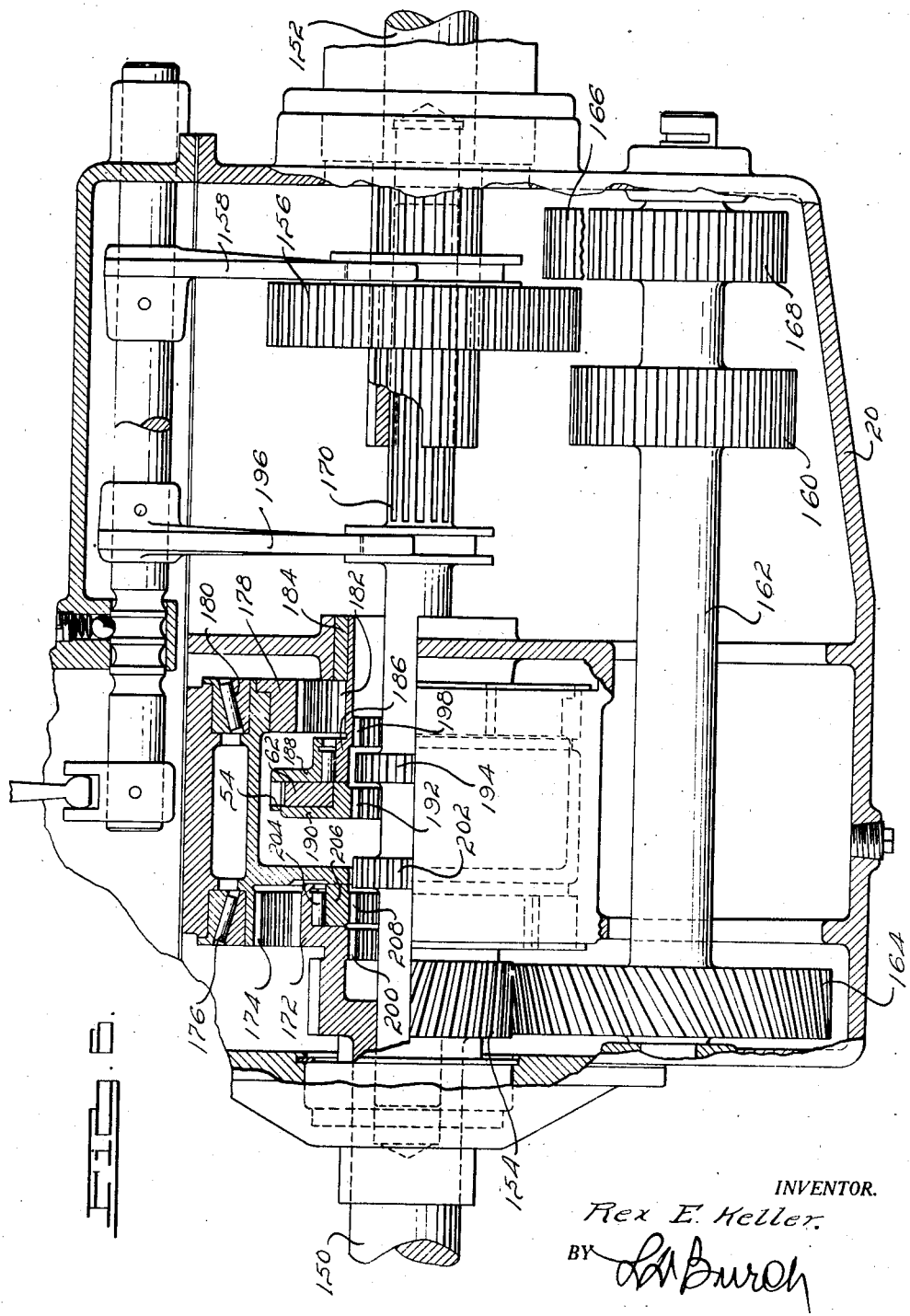

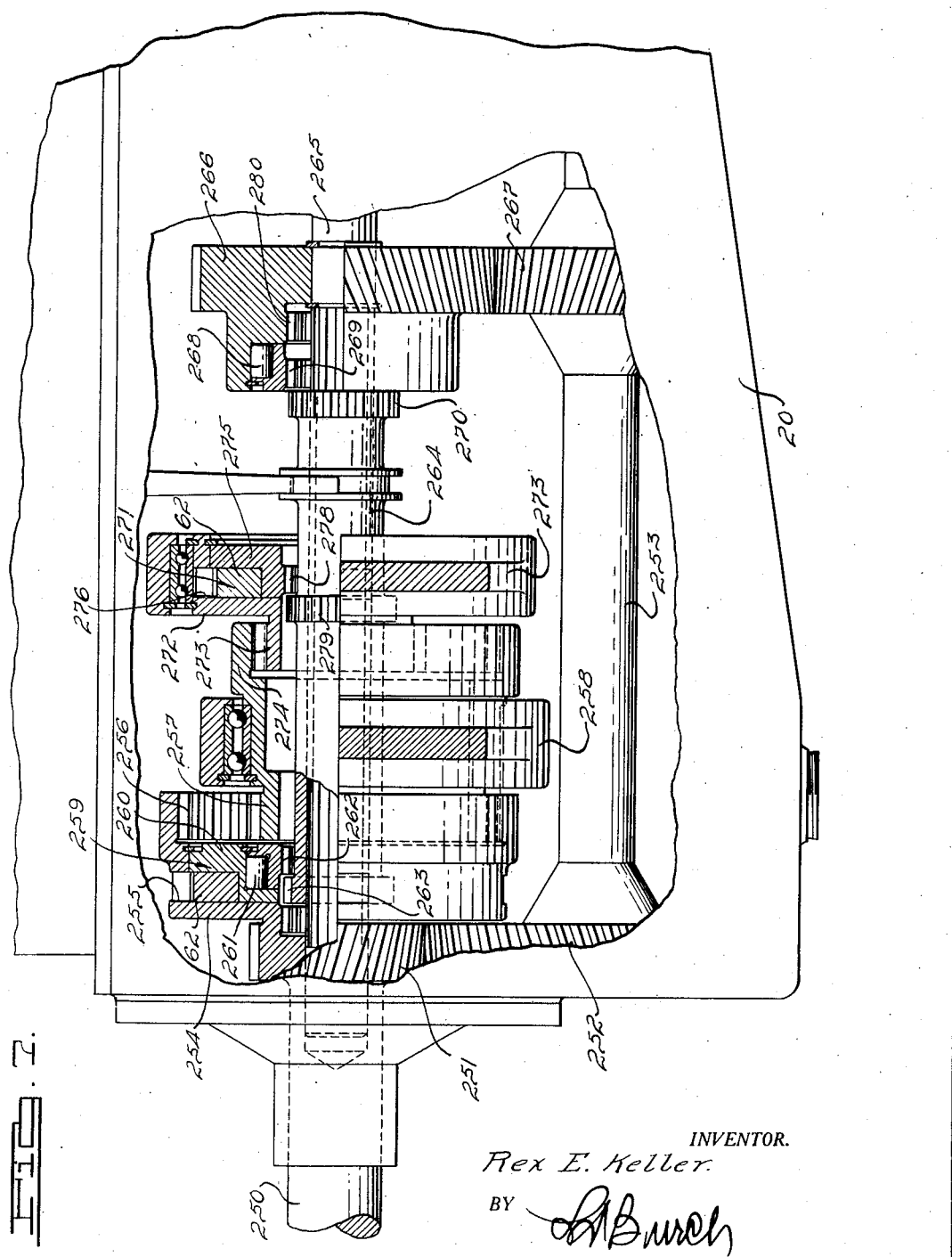

Dec. 17, 1940.  R. E. KELLER  2,225,174
AUTOMATIC TRANSMISSION
Filed March 14, 1934  5 Sheets-Sheet 5

INVENTOR.
Rex E. Keller.
BY
ATTORNEY.

Patented Dec. 17, 1940

2,225,174

UNITED STATES PATENT OFFICE 2,225,174

AUTOMATIC TRANSMISSION

Rex E. Keller, Beverly Hills, Calif.

Application March 14, 1934, Serial No. 715,513

4 Claims. (Cl. 74—336)

This invention relates to transmission mechanisms and particularly the application of automatic speed changing mechanisms to various types and arrangements of power transmitting mechanisms operable for providing variable speed driving connections between a driving shaft and a driven shaft.

As illustrated in the accompanying drawings, an automatic speed changing mechanism including driving and driven clutch members having a centrifugally operable bolt carried by one of said members and operable upon synchronization of the rotative speeds of said clutch members for positive locking engagement with the other of said clutch members, is provided for effecting changes in the ratio of the driving connection between a driving shaft and a driven shaft, between which shafts an overrunning clutch having an element operatively connected to each of said shafts is provided for effecting an initial one-way driving connection for initiating the rotation of said driven shaft and the clutch members connected thereto.

A principal object of the invention is to provide an overdrive transmission for driving a driven shaft at a rate faster than that of a driving shaft with an automatic speed changing mechanism for effecting a change from a direct to an overdrive with manually operable means whereby selective changes in the character and ratio of the driving connection may be made without regard to the automatic speed changing mechanism.

In my Patent No. 1,969,561, issued Aug. 7, 1934, for "Transmission mechanism" on an application Ser. No. 558,657, filed August 22, 1931, I have shown and described an automatic transmission mechanism of the underdrive type wherein a one-way clutch is operable for providing an initial one-way driving connection between driving and driven shafts, and a centrifugally operated clutch is operable for providing a driving connection between the shafts around the one-way clutch and at a ratio different than the ratio of the driving connection provided by the one-way clutch, together with a shiftable clutch member which is cooperable with other clutch members for locking out the one-way clutch and the centrifugal clutch, for providing selective driving connections between the driving and driven shafts. In my said prior patent, it was contemplated that the transmission arrangement therein illustrated was not material to the invention therein claimed as the automatic speed changing mechanism may be employed in any standard type of transmission. The present application illustrates the application of the automatic speed changing mechanism illustrated in my prior patent to overdrive types of transmissions.

Other objects and advantages will be apparent from a reference to the following specification taken in conjunction with the accompanying drawings, of which there are five sheets and in which:

Fig. 1 is a diagrammatic side elevational view of a portion of an automotive vehicle and illustrating the application thereto of an overdrive transmission embracing my invention;

Fig. 2 is a longitudinal vertical view, partly in section and illustrating an overdrive transmission embracing one form of my invention;

Fig. 3 is a view taken in the plane on the line 3—3 of Fig. 2, looking in the direction of the arrows;

Fig. 4 is a vertical cross sectional view taken in a plane on the line 4—4 of Fig. 2 and illustrating the details of an overrunning or free wheeling clutch;

Fig. 5 is a vertical cross sectional view taken in a plane on the line 5—5 of Fig. 2, illustrating the details of the centrifugally actuated clutch which forms a part of the automatic speed changing mechanism;

Fig. 6 is a longitudinal view, partly in section, of a modified form of overdrive transmission and illustrating the application thereof to a more or less conventional change speed gearing;

Fig. 7 is a longitudinal vertical view, partly in section, illustrating a further modification of the invention;

Fig. 8 is a longitudinal vertical view, partly in section, of a further modified form of overdrive transmission;

Fig. 9 is a detail view of the mechanism for shifting parts of the overdrive transmission illustrated in Fig. 8;

Figure 10:
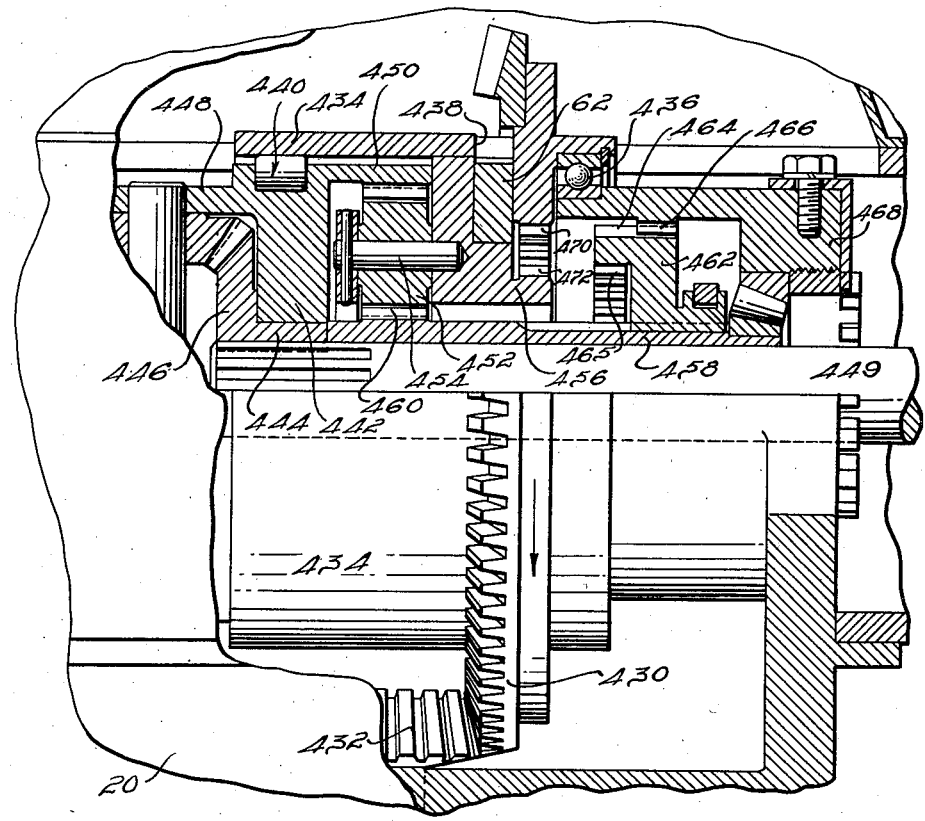
Fig. 10 is a top plan view partly in section and illustrating the application of an automatic speed changing mechanism to a differential for effecting an overdrive of the rear axle.

Referring now to Figs. 1 to 5, inclusive, of the drawings, there is shown, more or less diagrammatically, a portion of an automotive vehicle having an engine 12, a housing-enclosed clutch mechanism 14, a change speed gearing 16 provided with a manipulative shift lever 18 for adjusting the same, and an over drive transmission 20 provided with a dash control 22 for selectively adjusting the same.

The overdrive transmission, in general, comprises a driving shaft 24, which is operatively connected to the main shaft of the transmission 16, a driven shaft 26, which is operatively connected to the rear road wheels of the vehicle, an overrunning clutch 28 having an element operatively connected to each of said shafts for providing a one-way driving connection between the same, a centrifugally actuated clutch, indicated generally at 30, having one element operatively connected to said driven shaft, and a driving element operatively connected to the driving shaft 24 by a countershaft gear cluster 32, which is operable for driving the driving element of the centrifugally actuated clutch at a higher rate than the driven element thereof during the time the overrunning or free wheeling clutch 28 is providing a one-way direct driving connection between the driving and driven shafts.

A gear 34, fixed to the driving shaft 24 to rotate therewith, is provided with a flanged portion 36 which affords the driving element of the overrunning clutch 28 which includes a driven element 38 and a plurality of spring-pressed rollers 40, one of which is disposed in each of a plurality of eccentric raceways 42 provided between oppositely disposed surface portions of the driving element 36 and the driven element 38, so that when the driving element 36 is being driven in the direction of the arrow indicated in Fig. 4, the driven element 38 will rotate therewith, but will be free to rotate in the same direction but at a higher rate of rotation than the driving element 36. The gear 34 is provided with an internal set of teeth 44 which afford a positive driving clutch element with which an external set of teeth 46 provided on a sleeve 48 slidably splined to the driven shaft 26 are adapted to mate to provide a direct two-way driving connection between the driving and the driven shafts.

The driven element 38 of the overrunning clutch is provided with an internal set of teeth 50 which provide a free wheeling clutch driving element and which are adapted to be mated with the external set of teeth 46 provided on the sleeve 48 to provide a direct one-way driving connection between the driving and the driven shafts.

The centrifugally actuated clutch 30 comprises a drum-shaped driving member 52 provided with one or more bolt-engaging recesses 54 and mounted upon an annular flanged portion 56 formed on a gear 58 which is rotatably mounted upon the driven shaft 26, a driven or core member 60 nested within the drum-shaped driving member 52 and provided with one or more movable bolts 62 which are adapted to be projected into the bolt-engaging recesses 54 for locking the clutch elements 52 and 60 together. Gear 58 is operatively connected to gear 34 by gears 64 and 66 of the countershaft gear cluster 32, so as to rotate at a faster rate of speed than gear 34. A plurality of spring-pressed rollers such as 40 may be disposed one in each of a plurality of annularly spaced eccentric raceways provided between oppositely disposed surface portions of flange 56 and drum-shaped clutch member 52 for the purpose of providing a one-way driving connection between the same, so that the drum-shaped clutch member 52 will be free to overrun the annular flange 56. The driven element 60 of the centrifugally actuated clutch is provided with an internal set of teeth 70, which are adapted to be mated with an external set of teeth 72 provided on one end of the sleeve 48 for operatively connecting the driven clutch element 60 to the driven shaft 26.

Sleeve 48 is adapted to be shifted by a yoke 74 carried by a shifter rod 76, one end of which is connected to a Bowden wire 78 leading to dash control 22, which is adapted to be manually operated. It will be noted that if sleeve 48 is shifted to the right, looking at Fig. 2, the teeth 72 will be mated with the teeth 70 of the driven clutch element 60 at the same time that the teeth 46 will be mated with the teeth 50 of the free wheeling clutch element 38, so that if the drive shaft 24 is rotating in the direction indicated by the arrow in Fig. 4, the driven shaft 26 and core clutch element 60 of the centrifugally actuated clutch will be rotating at the same rate as that of the driving shaft 24, while the gear 58 and clutch element 52 of the centrifugally actuated clutch will be rotating at a rate in excess of that of the driven shaft 26 and clutch element 60. The flanged portion 56 of gear 58 is provided with an internal set of teeth 80, which are adapted to be mated with teeth 72 on the sleeve 48 to provide a two-way locked-up driving connection between gear 58 and the driven shaft, so that the same will, when the driving shaft 24 is rotating in the direction indicated by the arrow, rotate at a rate in excess of that of the driving shaft.

Each of the bolts 62 is mounted within a groove 82 and normally retained therein by a spring 84 disposed within a bore 86 provided in the body of the bolt 62 and confined between a pin 88, affixed to the clutch element 60 and extending through an opening 90 in the bolt 62 and an adjustable plug 92 threadedly secured within the bore 86. The driven clutch element 60 may be provided with a spring-pressed poppet 94 backed by an adjustable plug 96 bearing against one side of the bolt 62 and engageable in a notch 98 therein when the bolt is in its outer or projected position for delaying the inward movement of the bolt under the influence of spring 84. The bolt 62 is movable outwardly responsive to centrifugal force resulting from rotation of the clutch element 60 at a rate which may be selected by adjustment of the plug 92 to vary the tension of spring 84 and by a second spring-pressed poppet 100 carried by the clutch element 60 and engaging a notch 102 for delaying the outward movement of the bolt 62. Since the spring-pressed poppets 94 and 100 delay the movement of the bolt 62 from one of its positions to the other under the influence of centrifugal force or of the spring 84, there will be a difference between the rotative speeds of the clutch element 60 at which the bolt moves from one of its positions to the other. The spring-pressed poppets also will insure a quick positive movement of the bolts from one of their positions to the other and avoid a hang-up of the same in an intermediate position. As indicated in Fig. 5, the drum-shaped clutch member 52 is provided with a bolt-engaging recess 54, one for each of the bolts 62, although it will be appreciated that the number of recesses 54 and bolts 62 may be varied.

When the sleeve 48 has been shifted to the right to connect the free wheeling clutch element 38 to the driven shaft 26 and the clutch element 60 to the driven shaft 26, a one-way direct driving connection will be afforded between the driving and the driven shafts and the drum-shaped clutch member 52 will overrun the core clutch member 60, in the direction indicated by the arrow in Fig. 5. The bolt 62, after the speed of rotation of the core clutch element 60 attains a predetermined rate, will tend to move outwardly under the action of centrifugal force. Each of the bolts 62 is provided with a beveled or tapered surface 106 which will cause the bolts 62 to jump the recesses 54 until the rotative speeds of the core and drum clutch members are approximately synchronous, when the bolts 62 will move outwardly under the action of centrifugal force and connect the elements of the centrifugally actuated clutch together. The drum-shaped clutch member 52 may be brought down to the speed of the core clutch member 60 by a momentary deceleration of the rotative speed of the driving shaft 24 so that if the bolts 62 are moved outwardly during the period of synchronization of the elements of the centrifugally actuated clutch, the driven shaft 26 will, when the driving shaft 24 is subsequently accelerated, be driven from the gear 58 and through the centrifugally actuated clutch at a higher rate of speed than that of the driving shaft, the overrunning clutch 28 permitting the driven shaft and sleeve 48 to overrun the driving shaft 24 at such time. Subsequent deceleration of the rotative speed of the core clutch element 60 below that necessary to hold the bolts 62 in their outer position will permit the spring 84 to move the same inwardly, assuming that at such time the torque between the shafts is released, as a result of which the driven shaft 26 will be driven through the overrunning clutch 28 by the driving shaft 24 and at the same rate of speed thereof.

When the driven shaft 26 is being driven through the centrifugally actuated clutch 30, the drive will be a one-way drive on account of the free wheeling clutch which is shown in Fig. 2 as being built into the centrifugally actuated clutch, although it will be appreciated that such free wheeling clutch is not essential to the operation of the centrifugally actuated clutch. When the driven shaft is being driven through the overrunning clutch 28 and the centrifugally actuated clutch 30, the sleeve 48 may be shifted, selectively, to positively lock the driven shaft to the gear 34 or to the gear 58, if desired.

The yoke 74 is mounted upon shifter rod 76 so as to be capable of movement relative thereto and is biased by a spring 75 against a collar 77 fixed on the shifter rod 76. A lever 79, pivoted to the case of the overdrive transmission at 81, has one arm 83 which is adapted to be engaged by a shifter rail 85 which carries the fork for selecting a reverse drive and a second arm 87 which is engageable with a lug 89 provided on the yoke 74, so that when the shifter rail 85 is moved for selecting a reverse gear, the lever 79 will be pivoted about its pivot, and as a result thereof will engage the lug 89 of the yoke 74 for moving the same to the left to mate the teeth 46 of the sleeve 48 with the teeth 44 internally provided on the gear 34 to establish a direct two-way driving connection between the driven shaft 26 and the driving shaft 24 so that the vehicle may be driven rearwardly. The spring 75, which is confined between the yoke 74 and a collar 91 fixed to the shifter rod 76, will permit the yoke 74 to be shifted without shifting of the shifter rod 76 and also will return the fork 76 to its original position after the transmission is set for neutral subsequent to driving the car rearwardly in reverse. The overdrive mechanism thus will be locked out every time it is desired to drive the car through the reverse gear drive.

In Fig. 6 of the drawings, there is illustrated a modified form of the invention in which an overdrive is shown as incorporated in a selective change speed gearing having a driving shaft 150, a driven shaft 152, a gear 154 fixed to rotate with the driving shaft, a slidable gear 156 splined to the driven shaft for rotation therewith and adapted to be shifted by a yoke 158 to mesh with a gear 160 of a countershaft cluster of gears 162 having a gear 164 constantly in mesh with gear 154 and with an idler gear 166 constantly in mesh with a gear 168 of the countershaft gear cluster. An auxiliary or intermediate shaft 170 is journaled at its forward end in a counterbored end of the driving shaft 150 and is slidably splined to the driven shaft 152. A gear 172, fixed to rotate with gear 154, is constantly in mesh with an internal gear 174 mounted for rotation in suitable roller bearings 176. A second internal gear 178, smaller in size than that of gear 174, is integrally connected thereto and mounted in suitable bearings 180 and is constantly in mesh with external gear 182 journaled for rotation in a bearing 184. The gear 182 is provided with a flanged portion 186 which is adapted to provide a support for a centrifugally actuated clutch identical to that disclosed in Figs. 2 and 5, and having a drum-shaped clutch member 188 and a core clutch member 190 provided with an internal set of teeth 192 which are adapted to be mated with a toothed clutch element 194 provided on the auxiliary shaft 170.

The shaft 170 is adapted to be shifted by a yoke 196. Gear 182 is provided with an internal set of teeth 198 affording an overdrive positive clutch element and which are adapted to be mated with toothed clutch element 194 to provide a two-way overdrive connection between the driving and the driven shafts since gear 182 will be driven through the internal gears 174 and 178 at a faster rate than gear 172. Gear 172 is provided with an internal set of teeth 200 adapted to be mated with a toothed clutch element 202 provided on shaft 170 and spaced from clutch element 194 to provide a two-way direct driving connection between the driving and the driven shafts. The gear 172 is also provided with an integral free wheeling or overrunning clutch 204 of the type illustrated in Fig. 4 of the drawings and having a clutch element 206 provided with an internal set of teeth 208 which are adapted to be mated with toothed clutch element 202 of the shaft 170 to provide a one-way or free wheeling driving connection between the driving and driven shafts for driving the driven shaft at the same rate of speed as that of the driving shaft.

Movement of the shaft 170 to mate toothed clutch element 194 with internal teeth 192 of the clutch element 190 of the centrifugally actuated clutch is simultaneously adapted to mate toothed clutch element 202 with teeth 208 internally provided on the free wheeling clutch element 206 so that clutch element 190 of the centrifugally actuated clutch at such time is operatively connected to the driven shaft to rotate therewith while the drum-shaped clutch element 188 will be driven at a higher rate of speed since at such time it will rotate with gear 182.

Subsequent deceleration of the speed of the driving shaft 150 will slow down gear 182 and drum-shaped clutch element 188 rotatable therewith and permit the driven shaft 152 to continue rotating, the overrunning clutch 204 permitting the coasting of the driven shaft with the core clutch element 190 which at such time is connected to the driven shaft 152. When the rotative speeds of the clutch elements 188 and 190 are approximately synchronous, the bolts 62 will be projected into the bolt-engaging recesses 54 for interconnecting the members of the centrifugally actuated clutch, whereby the driven shaft 152 will be driven through the centrifugally actuated clutch, gear 182, internal gears 178 and 176 and gear 172 from the driving shaft 150 and at a faster rate of rotation than the same.

It will be appreciated that greater increase in the ratio of the speed of the driven shaft to that of the driving shaft may be obtained by varying the size of the internal gears 174 and 178 with respect to those of the gears 172 and 182 and that the size of the internal gears 174 and 178 might be so increased as to permit the countershaft of the gear cluster 162 to pass through the same. The power transmitting mechanism disclosed in this modification is adapted to be operated selectively as a three-speed transmission and provides an automatic change from a direct free wheeling drive to an overdrive free wheeling driving connection between the shafts and also selective operation for locking the same up in direct or in overdrive and locking out the centrifugally actuated clutch.

In the modification disclosed in Fig. 7, a driving shaft 250 has affixed thereto a drive gear 251 meshing with a gear 252 of a countershaft gear cluster 253 and a drum 254 provided with one or more bolt-engaging recesses 255 and affording an internal gear 256 constantly in mesh with an external gear 257, journaled in a suitable bearing 258 and having its axis eccentric with respect to that of internal gear 256. The drum 254 provides the driving member of a centrifugally actuated clutch 259, similar to that disclosed in Fig. 5 of the drawings, and the driven member of which is provided by a core 260 nested within the drum 254 and affording the driving element of an overrunning clutch 261, the driven element of which is provided by an internal gear 262 which is adapted to be coupled with a toothed clutch element 263 formed upon one end of a shiftable clutch sleeve 264 which is slidably splined to the driven shaft 265.

The overrunning clutch 261 is of the type disclosed in Fig. 4 of the drawings, in which a spring-pressed roller is adapted to be wedged between the oppositely disposed surface portions of an eccentric raceway for locking two clutch elements for rotation in one direction. In the case where the overrunning clutch 261 is disposed between the core member 256 of the centrifugally actuated clutch and the driven shaft 265, it is essential that the tension or force of the spring biasing the roller into the restricted portion of the raceway be greater than normal, so that when the core clutch member 256, which carries the slidable bolt 62 is not being driven, it will tend to coast along with the clutch sleeve 264. For the purpose of initiating the rotation of the driven shaft, a gear 266, mounted for free rotation on the driven shaft 265, is constantly in mesh with a gear 267 of the countershaft cluster of gears and is provided with a free wheeling or overrunning clutch 268, the driven element of which is provided with an internal set of teeth 269, which are adapted to be coupled with a toothed clutch element 270 provided on one end of the slidable sleeve 264 to provide a one-way reduced speed driving connection between the driving shaft and the driven shaft and through the intermediary of gears 251, 252, 267, 266 and overrunning clutch 268. The centrifugally actuated clutch 259 is of the type illustrated in Fig. 5 of the drawings and is adapted to provide automatic changes between a reduced and a direct driving connection between the driving and the driven shafts. When the bolt 62 of the centrifugally actuated clutch 259 is projected into one of the bolt-engaging recesses 255, responsive to centrifugal force resulting from rotation of the core clutch member 260, the drive between the shafts will be direct and through the centrifugally actuated clutch 259 and the overrunning clutch 261, which will permit the driven shaft 265 and sleeve 264 to rotate at a rate in excess of that of the driving shaft 250 such as when the speed of the driving shaft is reduced by a slowing down of the engine.

A second centrifugally actuated clutch 271, similar in all respects to clutch 259, is provided for effecting an automatic change from a direct to an overdrive and comprises a clutch drum 272, mounted for rotation in a suitable bearing 273' and provided with an integral external gear 273 which is in constant mesh with an internal gear 274 formed integral with gear 257. The core clutch element 275 of the centrifugally actuated clutch 271 is provided with one or more bolts 62, which are adapted to be projected into the bolt-engaging recesses 276 provided in the clutch drum 272 for interlocking the core 275 to the drum 272. The clutch core 275 is provided with an internal set of teeth 278 which are adapted to be coupled with a toothed clutch member 279 formed on the sleeve 264 so that when sleeve 264 is shifted to the right, the core clutch members of centrifugally actuated clutches 259 and 271 will be operatively connected to the driven shaft 265, which initially will be driven by the intermediate speed gear 266 since at such time the driven element of the overrunning clutch 268 will be coupled to the toothed clutch element 270.

While the centrifugally actuated clutches 259 and 271 are similar in construction and operation, the bolts 62 of the clutch 271 will be set to be moved under the influence of centrifugal force at a higher rate of rotation of the driven shaft than the bolt 62 of the centrifugally actuated clutch 259, so that when accelerating during the time the driven shaft is being driven through the overrunning clutch 268, the centrifugally actuated clutch 259 will operate first to provide a direct driving connection between the shafts, and subsequently when the driven shaft attains a higher rate of speed, the centrifugally actuated clutch 271 will operate to change from a direct to an overdrive connection between the shafts. The intermediate speed gear 266 may be provided with an internal set of teeth 280 to which the toothed clutch element 270 may be coupled for providing a positive or two-way driving connection between the gear 266 and the driven shaft 265, in which event the centrifugally actuated clutches 259 and 271 cannot operate, since the core members of the clutches cannot be synchronized with the drum-shaped members of the clutches when a two-way driving connection is provided between the driving and the driven shafts.

The internal and external gears 256, 257, 274 and 273 provide a means whereby the drum 272 of the centrifugally actuated clutch can be driven at a rate in excess of that of the driving shaft 250, so that when the core member 275 on the centrifugally actuated clutch 271 is locked to the drum member 272 of the centrifugally actuated clutch, the driven shaft 265 will be driven at a rate in excess of that of the driving shaft 250.

In the modification disclosed in Figs. 8 and 9, a driving shaft 350 has a gear 352 fixed thereto and in constant mesh with a gear 354 rotatably mounted in a suitable bearing 356. A gear 358, fixed to a driven shaft 360 for rotation therewith, is in constant mesh with a gear 362 fixed for rotation with a countershaft 364, one end of which is journaled in a suitable bearing 366 and the other end of which is journaled in a bore in the gear 354. An externally splined shaft 368 is journaled in gears 352 and 358 and has splined thereto a slidable sleeve 370 which at one end thereof is provided with an external set of teeth 372 adapted to mate with an internal set of teeth 374 internally provided on the gear 352 for the purpose of locking the intermediate shaft 368 to said gear for rotation therewith. The sleeve 370 at the other end thereof is provided with a toothed clutch element 376 which is adapted to be engaged with an internal set of teeth 378 provided on an annular flange 380 which may be formed integral with the gear 358.

An overrunning clutch 382 of the type disclosed in Fig. 4 of the drawings is disposed between intermediate shaft 368 and the annular flange 380 of the gear 358 for providing a one-way driving connection between the shaft 368 and the gear 358 so that the latter may rotate at a rate in excess of that of the shaft 368. Sleeve 370 is adapted to be shifted to the left, looking at Fig. 8, to mate teeth 372 thereof with teeth 374 of the gear 352 for locking the intermediate shaft 368 for rotation with gear 352. Further movement of sleeve 370 to the left will couple teeth 376 and 378 which will effect a two-way driving connection betwen gears 352 and 358, as a result of which the driven shaft 360 will be driven in unison with the driving shaft 350.

Gear 354 is provided with a portion 390 which provides a driving member of an overrunning clutch 392 of the type illustrated in Fig. 4 of the drawings and is provided with a set of teeth 394 cooperable with a toothed clutch element 396 slidably splined to the countershaft 364 for affording a positive locked-up overdrive connection between the driving and the driven shafts and through the intermediary of gears 352, 354, clutch element 394, countershaft 364 and gears 362 and 358. The driven element 397 of the overrunning clutch 392 is provided with a plurality of bolt-engaging recesses 398 which are adapted to receive movable bolts 62 carried by a driven or core clutch member 400. The clutch members 397, 400 and the bolt 62 provide a centrifugally actuated clutch of the type illustrated in Fig. 5 of the drawings, which is operable responsive to centrifugal force and as here shown is adapted to effect a driving connection between gear 354 and countershaft 364. As shown in Fig. 8 of the drawings, the toothed clutch element 396 is in engagement with the teeth 394 of gear 354, but the clutch member 396 may be relieved from engagement with said teeth by shifting the same to the right, as a result of which only the teeth 402 of the core clutch member 400 will be mating with toothed clutch element 396.

A lever 404 suitably secured at 406 to the case of the overdrive transmission is provided with an arm 408 engageable with a shifter rod 410 carrying a fork 412 which is operable for shifting clutch member 396 upon the countershaft 364. The lever 404 is provided with a second arm 414 engageable with a shifter rod 416 carrying a yoke 418 which is engageable with sleeve 370 for shifting the same upon the intermediate shaft 368. It will be observed that movement of the lever 404 upon its pivot is adapted to move clutch member 396 in a direction opposite to that in which clutch sleeve 370 is moved so that when sleeve 370 is shifted to the left to couple teeth 372 and 374, the clutch element 396 will be shifted to the right so as to be relieved from engagement with teeth 394 provided on the gear 354, while further movement of sleeve 370 to the left to couple teeth 376 and teeth 378 will uncouple the slidable clutch element 396 from engagement with teeth 402 provided on the core clutch member 400.

Assuming that sleeve 370 has been shifted to the left, looking at Fig. 8, to couple teeth 372 and teeth 374, a one-way direct driving connection will be afforded between the driving and the driven shafts, as a result of which clutch element 397 of the centrifugal clutch will be rotating at a definite rate of speed, while the core clutch element 400 of the centrifugally actuated clutch will be rotating at a lower rate of speed since the same at such time will be driven from the driven shaft through gears 358 and 362, as a result of which a relative rotation between the elements of the centrifugal clutch will exist. Subsequent to the attainment of a predetermined speed of rotation by the core clutch element 400 which will be sufficient to move the bolt 62 outwardly to engage in the bolt-engaging recesses 398, if the speed of rotation of the clutch element 397 is decelerated to that of the core clutch element 400 such as by temporary closing of the throttle governing the speed of the engine, the bolts 62 will be moved into the bolt-engaging recesses 398, as a result of which gear 354 will be connected to drive countershaft 364, whereby the driven shaft 360 will be driven through gears 358, 362, the centrifugally actuated clutch and gears 354 and 352 at a higher rate of rotation than that afforded by the direct one-way driving connection, since the gears 354 and 362 on the countershaft will provide a stepped-up or overdrive connection between the driving and the driven shafts.

In Fig. 10 of the drawings there is shown a modified form of the invention in which an automatic speed changing mechanism is applied to a dual ratio differential in which a beveled gear 430 is driven by a beveled gear 432 fixed for rotation with the propeller shaft (not shown). The gear 430 is mounted upon a drum 434 which is rotatably mounted upon a suitable bearing 436, at one end thereof, and is provided with one or more bolt-engaging recesses 438 similar to those disclosed in Fig. 5 of the drawings. A portion of the drum 434 affords a driving element of an overrunning clutch indicated generally at 440, the driven element 442 of which is rotatably mounted on the hub 444 of a beveled gear 446 which is splined to one end of an axle shaft 449. The driven element 442 of the overrunning clutch is provided with a housing portion 448 which carries within it the beveled gears providing the differential action between the axle shafts. An internal gear 450 may be formed integral with the driven element 442 of the overrunning clutch and is in constant mesh with one or more planet gears 452 rotatably mounted on the shaft 454 secured to a rotatable core clutch element 456.

A sleeve 458 disposed about axle shaft 449 is formed at one end to provide a sun gear 460 with which planet gear 452 is in mesh and which, as shown, is held against rotation by a shiftable collar 462 internally splined to sleeve 458 and having an external set of teeth 464 mating with a set of gear teeth 466 internally provided on a fixed housing 468. Core clutch element 456 is provided with one or more movable bolts 62 which are adapted to be projected into the bolt-engaging recesses 438 under the action of centrifugal force for interlocking the drum 434 with the core clutch member 456. The rotatable drum 434 together with the core clutch member 456 comprise the elements of a centrifugally actuated clutch of the type illustrated in Fig. 5 of the drawings, and the bolt 62 of which is operable responsive to centrifugal force and upon approximate synchronization of the rotative speeds of the clutch elements to interconnect the same.

Upon rotation of the beveled gear 430 in the direction indicated by the arrow, drum 434, which carries gear 430, will rotate with the same and drive, through gear carrier 448, an axle shaft 449 with the same and through the overrunning clutch 440. Since sleeve 458 is fixed against rotation, the rotation of internal gear 450 will cause planet gears 452 to rotate about their shaft 454 and to revolve about sun gear 460, carrying clutch core 456 with the same, but at a lower rate of rotation than that of drum core 434. When sufficient speed of clutch core 456 has been attained to effect an outward movement of bolt 62 and the speed of drum 434 is decelerated to synchronize the same with that of clutch core 456, the bolt 62 will be projected into the bolt-engaging recesses 438 for locking the clutch core element 456 to the drum 434, as a result of which the rotation of planet gears 452 about their shaft 454 and revolution about fixed sun gear 460 will cause internal gear 450 to rotate at a rate in excess of that of the clutch core 456, as a result of which the axle shaft 449 will be driven at an increased rate of speed. When the rotative speed of the core clutch element decelerates to a point below that necessary to hold the bolt 62 in the bolt-engaging recesses, the bolt 62 will, upon release of torque between drum 434 and clutch core 456, be moved to its retracted position, with the result that clutch drum 434 will again be operative to drive the axle shaft 449 through the free wheeling or overrunning clutch 440. If desired, drum 434 and clutch core 456 may be provided with sets of gear teeth 470 and 472, respectively, with which sets of teeth 464 and 466, provided on collar 462, are adapted to be coupled for locking drum 434, clutch core or planet carrier 456 and clutch sleeve 458 together to provide a direct two-way driving connection between bevel gear 430 and axle shaft 449, and as a result of which the centrifugally actuated clutch will be, in effect, locked against operation; that is, the bolt 62 cannot operate to effect a change in the ratio of the driving connection between bevel gear 430 and axle shaft 449.

Figure 11:
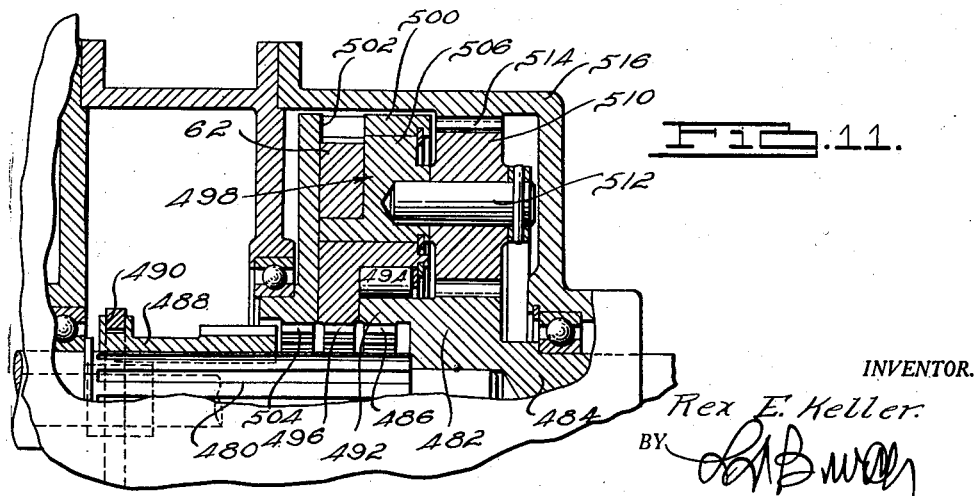
Fig. 11 is a modified form of overdrive transmission adapted to be located behind the change speed gearing.

In the modification disclosed in Fig. 11, one end of a driving shaft 480 is journaled in a sun gear 482, which may be formed integral with an end of a driven shaft 484 and provided with an internal set of teeth 486 which are adapted to be coupled with a toothed clutch element 488 slidably splined to the driving shaft 480 and movable by a suitable yoke or fork 490, which is manually operable. The sun gear 482 is provided with a portion 492 which forms a driven element of an overrunning or free wheeling clutch 494, similar to that disclosed in Fig. 4 of the drawings, and the driving element of which is provided by an internal gear 496 which also is adapted to be coupled with toothed clutch element 488 for the purpose of providing a one-way or free wheeling driving connection between the driving shaft and the driven shaft.

A centrifugally actuated clutch 498, like that disclosed in Fig. 5 of the drawings, comprises a drum clutch member 500 provided with one or more bolt-engaging recesses 502 and with an internal set of teeth 504 which are adapted to be coupled with toothed clutch element 488, a core clutch member or planet gear carrier 506 nested within the drum 500 and having one or more movable bolts 62 which are movable into the bolt-engaging recesses 500 for interconnecting the drum 500 with the clutch core 506. One or more planet gears 510, mounted for rotation upon a shaft 512 carried by core clutch member 506, is in constant mesh with sun gear 482 as well as with an internal set of gear teeth 514 provided upon the inside of the gear casing 516 so that when toothed clutch element 488 is coupled with teeth 504 and internal gear 496, the planet gears 510 will rotate about the axis of their shafts 512 since sun gear at such time will be driven through the overrunning clutch 494, and as a result of which the planet gears 510 will bodily revolve around the sun gear 482 carrying the clutch core 506 with the same, but at a slower rate of rotation than the clutch drum 500 which at such time will be connected to the driving shaft 480 for rotation therewith.

When sufficient speed of rotation of the clutch core 506 has been attained to move the bolts 62 outwardly and the rotative speeds of the clutch drum 500 and the clutch core 506 have been synchronized, as by a temporary closing of the throttle controlling the speed of the engine to decelerate the rotative speed of the driving shaft 480, the bolt 62 will move outwardly into the bolt-engaging recess 502 for interconnecting the clutch drum 500 with the clutch core 506, as a result of which the driven shaft 484 will be driven through the centrifugally actuated clutch and the planetary gears 510 at a faster rate than that at which said driven shaft was driven through the overrunning clutch 494. The speed of the driven shaft 484 is increased to a speed greater than that of the driving shaft 480 because the planetary gears 510 in rolling on the gear teeth 514 provided on the case 516 will cause the sun gear 482 to rotate faster than the clutch core 506. The device illustrated in Fig. 11 is particularly suitable for an overdrive transmission which is adapted to be located behind the gear box of an automotive vehicle for stepping up the speed of the propeller shaft to which the shaft 44 may be connected.

While several specific embodiments of the invention have been illustrated and described, it must be appreciated that many modifications may be made in the construction thereof without departing from the scope of the invention, and for that reason I do not desire to be limited to any particular form or arrangement except in so far as such limitations are included in the following claims.

I claim:

1. In an overdrive transmission, the combination of aligned driving and driven shafts, a drive gear fixed to rotate with said driving shaft and provided with a positive clutch element, a gear rotatably mounted on said driven shaft and provided with a positive clutch element, a train of gears operatively connected to each of said gears for driving said gear on said driven shaft at a rate faster than that of said gear on said driving shaft, an overrunning clutch associated with said gear on said driving shaft, a centrifugally actuated clutch associated with said gear on said driven shaft and including a drum clutch member rotatable with said driven shaft gear, a core clutch member nested within said drum and having a bolt movable under the action of centrifugal force resulting from the rotation of said core, a slidable sleeve splined to said driven shaft and having clutch elements simultaneously engageable with said overrunning clutch and said core clutch member and operable for providing an initial one-way driving connection between said shafts, and for rotating said core clutch member at a lower rate of rotation than said drum clutch member, a bolt-engaging recess provided in said drum and adapted to receive said bolt for connecting said core and drum for rotation together, said centrifugally actuated clutch including means associated with said bolt for preventing the movement thereof into said recess until the rotative speeds of said core and drum are substantially synchronous, and manually operable means for shifting said sleeve selectively to couple the clutch elements thereof with either of said positive clutch elements to provide a locked-up driving connection between each of said gears and said driven shaft, respectively, and around said overrunning and said centrifugally actuated clutches.

2. In an overdrive, the combination of driving and driven shafts, each provided with a toothed member, an overrunning clutch having an element fixedly connected to one of said toothed members, clutch means including a shiftable sleeve cooperable with said overrunning clutch and the other of said toothed members to provide a one-way direct driving connection between said shafts, a train of gears driven from said driving shaft, a centrifugally actuated clutch including a drum driven by said train of gears and provided with a bolt-engaging recess, a core nested within said drum and provided with a bolt movable into said recess responsive to centrifugal force resulting from rotation of said core at a predetermined rate, and means for operatively connecting said core to said driven shaft toothed member, incidental to shifting said sleeve to provide said one-way direct driving connection between said shafts, for driving said core at a different rate than that of said drum, said centrifugally actuated clutch being provided with means associated with said bolt and operable for holding the same out of said recess until the relative rotation between said drum and core has been substantially eliminated, said bolt upon movement thereof into said recess being adapted to provide a driving connection between said shafts around said overrunning clutch and at a higher ratio than said one-way driving connection.

3. In an overdrive transmission, the combination of aligned driving and driven shafts, a drive gear fixed to rotate with said driving shaft, a gear rotatably mounted on said driven shaft, a train of gears operatively disposed between said gears on said driving and driven shafts for driving said gear on said driven shaft at a rate faster than that of said gear on said driving shaft, an overrunning clutch carried by said driving shaft, a centrifugally actuated clutch carried by said gear on said driven shaft and including a drum clutch member rotatable with said gear on said driven shaft, a core clutch member nested within said drum and having a bolt movable under the action of centrifugal force resulting from the rotation of said core, a slidable sleeve splined to said driven shaft and having clutch element simultaneously engageable with said overrunning clutch and with said core clutch member and operable for providing a direct one-way driving connection between said shafts, and for rotating said core clutch member at the same speed as said driven shaft but at a lower rate of speed than said drum clutch member, said drum clutch member being provided with a bolt-engaging recess adapted to receive said bolt for connecting said core and said drum for rotation together, said centrifugally actuated clutch including means associated with said bolt and operable for preventing the movement thereof into said recess until the rotative speeds of said core and said drum are substantially synchronous, and manually operable means for shifting said sleeve.

4. In an overdrive transmission, the combination of aligned driving and driven shafts, a positive clutch element carried by said driving shaft, a gear adapted to be connected to said driven shaft and connected to said driving shaft to be driven therefrom through a train of gears at a rate faster than that of said driving shaft, said gear being provided with a positive clutch element, an overrunning clutch connected to said driving shaft, a centrifugally actuated clutch associated with said gear and including a drum clutch member rotatable therewith, a core clutch member nested within said drum and having a bolt movable under the action of centrifugal force resulting from the rotation of said core, a slidable sleeve splined to said driven shaft and having clutch elements simultaneously engageable with said overrunning clutch and said core clutch member and operable for providing a direct one-way driving connection between said shafts, and for rotating said core clutch member at a lower rate of speed than said drum clutch member, a bolt-engaging recess provided in said drum and adapted to receive said bolt for connecting said core and drum for rotation together, said centrifugally actuated clutch including means associated with said bolt for preventing the movement thereof into said recess until the rotative speeds of said core and said drum are substantially synchronous, and manually operable means for shifting said sleeve selectively to couple the clutch elements thereof with either of said positive clutch elements to provide locked-up driving connections of different ratios between said shafts and around said overrunning and said centrifugally actuated clutches.

E. KELLER.